Nov. 12, 1968   V. C. CARR   3,410,509
AIRCRAFT ARRESTER GEAR
Filed Feb. 27, 1967   2 Sheets-Sheet 1

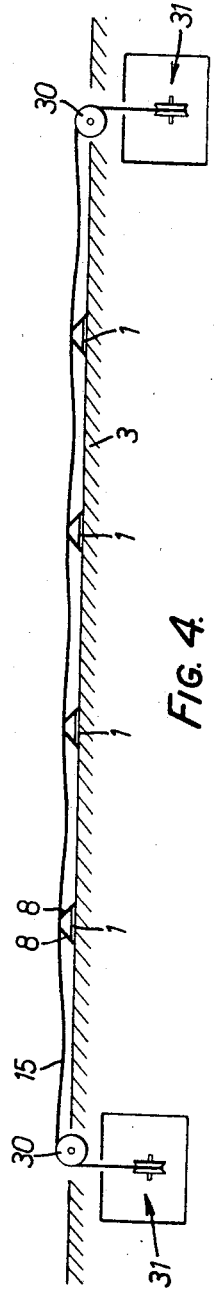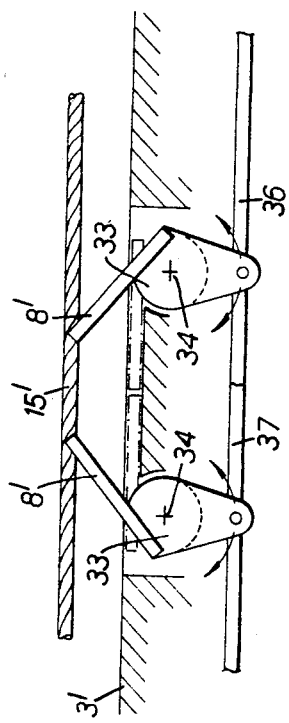

United States Patent Office 3,410,509
Patented Nov. 12, 1968

3,410,509
AIRCRAFT ARRESTER GEAR
Vivian Charles Carr, Oadby, England, assignor to John Bull Rubber Company Limited, Evington Valley Mills, Leicester, England, a British company
Filed Feb. 27, 1967, Ser. No. 618,700
Claims priority, application Great Britain, Mar. 12, 1966, 10,985/66
11 Claims. (Cl. 244—110)

ABSTRACT OF THE DISCLOSURE

In an aircraft arrester gear employing a cable supported on supporting devices at a required height above the surface of the landing deck to enable the aircraft arrester hook to catch the cable, each device comprises a rubber blade extending normal to the cable, the blade being inclined relative to the deck. The blade does not deny the hook access to the cable. It assists damping of ripples in the cable which may otherwise cause the hook to miss the cable. The blade is not a substantial hazard to trucks and personnel moving about the deck because it will deflect.

---

Figure 1:
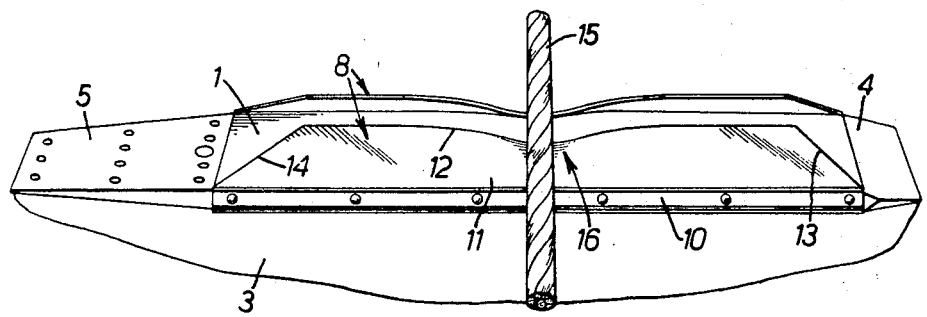

The invention concerns improvements relating to aircraft arrester gear of the type (hereinafter referred to herein as of the type hereinbefore defined) comprising a cable, and usually a plurality of cables, stretched transversely of a landing strip, which may be on a ship's deck or on land, by hydraulic or other energy absorbing means to arrest a landing aircraft when its arrester hook catches a cable, and devices by which the cable has to be supported at a required height clear of the strip in view of sagging of the cable due to its own weight, and in view of any drainage camber of the strip.

Typically, aircraft weighing in excess of 30,000 lbs. and travelling at a speed in excess of 100 knots have to be stopped in the short space allowed on an aircraft carrier's deck, and hydraulic means is used to absorb the energy of the aircraft transmitted via the arrester cable in approximately 220 ft. The cable is 4¼" circumference, 1.35" diameter, high tensile flexible steel cable which weighs 3.37 lbs. per foot and which is stretched across the deck between two sheaves 65 feet apart. The cable has to be supported approximately 3" above the deck, and for this purpose possibly four supporting devices are spaced apart between the two sheaves. Other requirements for a cable supporting device may be: that any ramp formation thereof must have a gradient of not more than 1 in 5; a temperature range of —40° C. to +60° C.; resistance to water; resistance to fuels and grease and occasional exposure to high jet pipe exhaust temperatures. The device should be about 3 ft. long to ensure correct transverse re-positioning of the cable between the sheaves by the hydraulic means.

Heretofore cable supporting devices have been used each comprising a metal bow spring a leading end of which is fixed relative to the deck and a trailing end of which is free to slide in a slot so that the device can deflect downwards to lie flat under a load of approximately 200 lbs.

The cable rests transversely across the apex portion of the bow. Such a device has no inherent damping effect upon a shock wave which is formed in the cable by the nose or main wheels of an aircraft having to land at relatively high speed and having to touch down before reaching the cable; this is as distinct from lower landing speeds where the cable could be hooked before touch down. The wave commences as a narrow depression in the cable extending down onto the deck and travels outwardly along the cable as a widening depression towards the sheaves at each side and is thence reflected back and so on. This can cause the cable to be depressed clear of the aircraft arrester hook at the instant when it passes, so that the hook misses the cable. Also, such a device denies the hook access to the wire in the event of the aircraft being so misaligned that the hook aligns with the device. The device does not hold the cable stably against accidental displacement longitudinally of the device, and similarly the cable is not readily re-positioned by the hydraulic means. The device is relatively expensive, and involves metal-to-metal wear between the cable and the spring and at the sliding end mounting. The device also tends to present a hazard to other vehicles or personnel moving about the deck.

To try to avoid some of these difficulties, various different devices have hitherto been tried with varying degrees of success.

As indicated, the arrester gear may be used for landing strips on ships' decks, or on land for use by military aircraft or commercial aircraft.

An object of the invention is to provide an effective cable supporting device for the arrester gear which avoids all of the above-mentioned disadvantages.

Thus from one aspect the invention provides a cable supporting device for arrester gear of the type defined wherein a blade of rubber or rubber-like material having a good abrasion resistance e.g. polyurethane, is fixed at one longitudinal edge portion to a base to be secured on the landing strip, a main body portion of the blade presents a free longitudinal edge portion to support the cable extending transversely thereacross at the required height above the strip, the main body portion of the blade with the free longitudinal edge portion is deflectable down toward the strip, and a trailing end edge portion of the blade is chamfered from the fixed longitudinal edge portion longitudinally inwardly towards the free longitudinal edge portion to induce the downward deflection when engaged by the cable (or other object) moving longitudinally toward the device.

From another aspect the invention provides an aircraft arrester gear comprising a cable stretched transversely of a landing strip by energy absorbing means to arrest a landing aricraft when its arrester hook catches the cable and a plurality of cable supporting devices supporting the cable at a required height clear of the strip, each such device comprising a blade of rubber or rubber-like material having a good abrasion resistance e.g. polyurethane fixed at one longitudinal edge portion to a base in turn secured to the landing strip, a main body portion of the blade presenting a free longitudinal edge portion supporting the cable with the cable extending transversely thereacross, the main body portion of the blade with the free longitudinal edge portion being deflected down towards the strip by the cable and a trailing edge portion of the blade being chamfered from the fixed longitudinal edge portion longitudinally inwardly towards the free longitudinal edge portion to induce the downward deflection of the blade when the cable is dragged on to the blade longitudinally of the blade from the side thereof adjacent its trailing edge portion.

Advantageously, the free edge portion and body portion of the blade are locally depressible or depressed to a slight extent by the cable weight to hold the cable against accidental displacement longitudinally of the blade.

Preferably, the leading end edge portion of the blade is chamfered similarly to the trailing end edge portion.

Suitably, the blade is substantially planar and inclined from the fixed to the free edge portion at an angle to the horizontal; the angle is preferably less than 45° and in a specific case is 40°.

The base may be in the form of a metal base plate presenting a correspondingly inclined longitudinal edge surface against which the fixed edge portion of the blade abuts, and an upper edge of such surface is rounded or otherwise suitably contoured to reduce bending stress in the blade.

The device or each device may comprise two such blades fixed to a common base and oppositely inclined from their fixed to free edge portions with the latter closest together so that they are deflectable or deflected down and toward each other.

Figure 2:
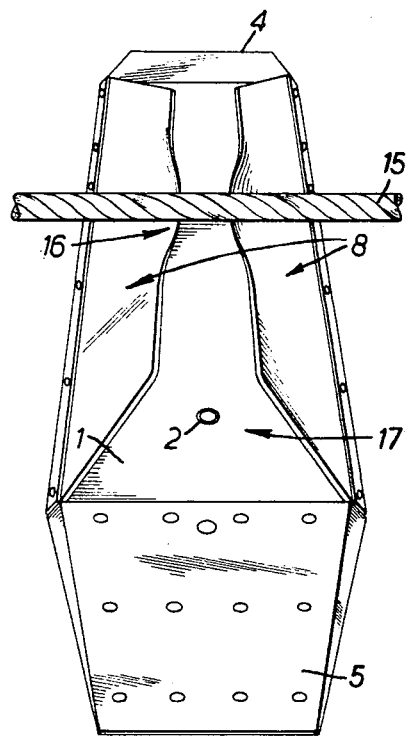
Figure 3:
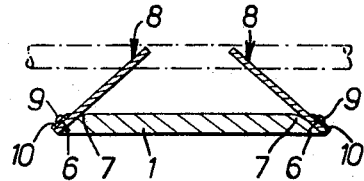

Specific embodiments of the invention are hereinafter described, by way of example, with reference to the accompanying drawings, wherein:

FIG. 1 is a perspective view of a cable supporting device according to the invention for an aircraft arrester gear of the type hereinbefore defined, the device being shown in use from above and one side, FIG. 2 is a perspective view from above and the leading end of the device shown in FIG. 1, FIG. 3 is a transverse section of the device shown in FIG. 1, FIG. 4 is a diagrammatic view of an aircraft arrester gear according to the invention using cable supporting devices as shown in FIGS. 1, 2 and 3, and FIG. 5 is an enlarged view of part of FIG. 4 showing a modification.

Referring to FIGS. 1 to 4 the device comprises a metal base plate 1 to be secured by screw means 2 to an aircraft carrier deck or other landing strip indicated at 3. The base plate is generally rectangular in plan but has an extension ramp 4 at the trailing end. A separate longer ramp 5 is secured to the deck by screw means at the leading end of the device. The base plate presents inwardly inclined longitudinal edge surfaces 6 each with a rounded or otherwise suitably contoured upper edge 7.

Each of the two blades 8 is of abrasion resistant rubber, namely polyurethane sold under the registered trademark "Prescollan," and is substantially planar with one longitudinal edge portion 9 abutting the corresponding base plate edge surface 6 and fixed by a clamping strip 10 screwed to the plate edge. Each blade has a main body portion 11 presenting a free longitudinal edge portion 12, and trailing and leading end edge portions 13 and 14 respecitevly chamfered from the fixed edge portions longitudinally inwards towards the free edge portion. Each blade is inclined from the fixed to the free edge portion at an angle to the horizontal determined by the inclination of the corresponding base plate edge surface 6. This angle is preferably less than 45° and as shown is 40°. Thus the two blades are fixed to the common base plate so as to be oppositely inclined from their fixed to free edge portions with the latter closest together, so that they are deflectable down and toward each other, but are not wide enough to meet above the base plate. The contoured edges 7 of the base plate reduce bending stresses in the blades.

In use, as shown in FIG. 4, the respective arrester cable 15 extends transversely across say four such devices suitably spaced apart between the sheaves 30. The cable is supported at rest on the free edge portions of the blades 8. The main body portions of the blades with the free edge portions are deflectable downwards, but are only locally depressed to a slight extent by the weight of the cable, as indicated at 16 (see FIG. 1), to hold the cable against accidental displacement longitudinally of the device. The dimensions and characteristics of the rubber blades and their mounting are such that the cable is thus supported at the desired height of about 3" above the deck. The load is taken by the rubber mainly in bending shear and also in compression.

An aircraft touching down before reaching the cable will strike the cable with its nose or main wheels, but the depression form of shock wave set up as explained above is damped by the blades so that the hook does not miss the cable.

If the aircraft is misaligned so that the hook travels up the leading base ramp, it can travel through the gap 17 between the blades, or deflect a blade downwards, again so as not to miss the cable.

The hooked cable is pulled from the trailing end of the device. When the cable is re-positioned by the hydraulic or like means generally indicated at 31 in FIG. 4 it travels up the trailing base ramp and up the chamfered trailing end portions of the blades which induces some downward deflection of the blades, back to rest on the free edge portion of the blades.

The chamfered trailing and leading end portions of the blades also induce downward deflection of the blades if accidentally engaged by objects moving longitudinally toward the device. Also the blades will deflect downward if engaged accidentally from the sides of the device. Thus the device is not a serious hazard to trucks or personnel or other objects moving about the deck.

The use of hydrolysis resistant polyurethane prevents the characteristics of the blades being affected by water, and especially prevents their freezing solid. Also the structure has no water traps and drains easily. The device is relatively cheap and simple to manufacture and install, yet is extremely effective and meets all the various requirements as specified above.

As a specific example some other dimensions of the device shown are:

| | |
|---|---|
| Length of blade _____ ft__ | 3 |
| Inclined height of blade _____ in__ | 5 |
| Thickness of blade _____ in__ | ½ |
| Width of base plate _____ ft__ | 1 |
| Inclined height of base edge surface 6 _____ in__ | 1½ |

The device may comprise only a single blade, or a pair of blades outwardly instead of inwardly inclined, or each blade may have a curved and/or non-uniform cross-section. Any other suitable means of fixing the blades to a base may be used. Thus referring to FIG. 5, each blade 8' may be attached to a separate base 33 which is mounted to rotate about a horizontal axis 34 normal to the direction of the arrester cable 15' and which is provided with operating gear 36, 37 below the level of the deck 3', and operable to rotate the base between an angular position in which the blade upstands from the deck surface at a required angle, say 40°, to support the arrester cable above the deck surface, and an angular position shown in chain dotted outline in FIG. 5 in which the blade is retracted and lies flat in a recess in and flush with the deck surface. The operating gear 36, 37 may operate to move all the blades in unison to raise all the blades and to lower all the blades and the blades 8' may have thickened root portions (not shown) enabling them to be bolted to the rotatable bases 34. Instead of the blades being retracted into the deck surface they may be flat on the deck surface when not required to hold a cable above the deck surface.

I claim:

1. In a cable supporting device adapted for use with an aircraft arrester gear having a cable stretched transversely of a landing strip by energy absorbing means to arrest a landing aircraft when its arrester hook catches the cable, a plurality of such cable supporting devices supporting the cable at a required height clear of the strip, the device comprising means adapted to be secured to the landing strip to underlie and thereby support the cable above the surface of the strip, the improvement wherein a blade of rubber-like material having good abrasion resistance properties is fixed at one longitudinal edge portion to a base to be secured to the landing strip, a main body portion of the blade presents a free longitudinal edge portion to support the cable extending transversely thereacross at the required height above the strip, the main body portion of the blade with the free longitudinal edge portion is deflectable down towards the strip, and a trailing end edge portion of the blade is chamfered from the fixed longitudinal edge portion longitudinally inwardly towards the free longitudinal edge portion to induce the downward deflection when engaged by the cable (or other object) moving longitudinally towards the device.

2. A device as claimed in claim 1 wherein the free edge portion and the body portion of the blade are locally depressible or depressed to a slight extent by the cable weight to hold the cable against accidental displacement longitudinally of the blade.

3. A device as claimed in claim 1 wherein the leading end edge portion of the blade is chamfered similarly to the trailing end edge portion.

4. A device as claimed in claim 1 wherein the blade is substantially planar and inclined from the fixed to the free end portion at an angle to the horizontal.

5. A device as claimed in claim 4 wherein the blade is inclined at an angle of less than 45°.

6. A device as claimed in claim 5 wherein the blade is inclined at an angle of 40°.

7. A device as claimed in claim 4 wherein the base is in the form of a metal base plate presenting a correspondingly inclined longitudinal edge surface against which the fixed edge portion of the blade abuts and an upper edge of such surface is rounded or otherwise suitably contoured to reduce bending stress in the blade.

8. A device as claimed in claim 4 wherein the device or each such device comprises two of said blades fixed to a common base and oppositely inclined from their fixed to free edge portions with the latter closest together so that they are deflectable or deflected down and toward each other by the weight of the cable.

9. A device as claimed in claim 1 wherein the base comprises a metal base plate carrying the blade, and the base includes a ramp extension for the trailing end of the metal base plate.

10. A device as claimed in claim 9 wherein the base further includes a ramp extension for the leading end of the base plate.

11. In an aircraft arrester gear comprising a cable stretched transversely of a landing strip by energy absorbing means to arrest a landing aircraft when its arrester hook catches the cable, and a plurality of cable supporting devices supporting the cable at a required height clear of the strip, said devices each comprising means adapted to be secured to the landing strip to underlie and thereby support the cable above the surface of the strip, the improvement which consists in that each such device comprises a blade of rubber-like material having good abrasion resistance properties fixed at one longitudinal edge portion to a base in turn secured to the landing strip, a main body portion of the blade presenting a free longitudinal edge portion supporting the cable with the cable extending transversely thereacross, the main body portion of the blade with the free longitudinal edge portion being deflected down towards the strip by the cable and a trailing edge portion of the blade being chamfered from the fixed longitudinal edge portion longitudinally inwardly towards the free longitudinal edge portion to induce the downward deflection of the blade when the cable is dragged on to the blade longitudinally of the blade from the side thereof adjacent its trailing edge portion.

References Cited

UNITED STATES PATENTS

| | | | |
|---|---|---|---|
| 3,146,974 | 9/1964 | Petoia | 244—110 |
| 3,148,849 | 9/1964 | Methven et al. | 244—110 |
| 3,158,341 | 11/1964 | Green | 244—110 |
| 3,167,277 | 1/1965 | Cotton | 244—110 |

MILTON BUCHLER, *Primary Examiner.*

P. E. SAUBERER, *Assistant Examiner.*